United States Patent
Bossetti (10) Patent No.: US 10,032,557 B1
(45) Date of Patent: Jul. 24, 2018

(54) TUNING OF PRIMARY AND SECONDARY RESONANT FREQUENCY FOR IMPROVED EFFICIENCY OF INDUCTIVE POWER TRANSFER

(71) Applicant: Apple Inc., Cupertino, CA (US)

(72) Inventor: Chad A. Bossetti, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 14/290,411

(22) Filed: May 29, 2014

(51) Int. Cl.
- *H02J 7/00* (2006.01)
- *H01F 38/14* (2006.01)
- *H02J 7/02* (2016.01)

(52) U.S. Cl.
CPC .............. *H01F 38/14* (2013.01); *H02J 7/025* (2013.01)

(58) Field of Classification Search
USPC ........................................................ 320/108
See application file for complete search history.

(56) References Cited

U.S. PATENT DOCUMENTS

| | | | |
|---|---|---|---|
| 4,268,899 A | 5/1981 | Rokas | |
| 5,293,308 A | 3/1994 | Boys et al. | |
| 5,639,989 A | 6/1997 | Higgins, III | |
| 6,960,968 B2 | 11/2005 | Odenaal et al. | |
| 6,972,543 B1 | 12/2005 | Wells | |
| 7,641,358 B1 | 1/2010 | Smith et al. | |
| 7,906,936 B2 | 3/2011 | Azancot et al. | |
| 7,948,208 B2 | 5/2011 | Partovi et al. | |
| 7,952,322 B2 | 5/2011 | Partovi et al. | |
| 8,024,491 B1 | 9/2011 | Wright et al. | |
| 8,054,651 B2 | 11/2011 | Pollard | |
| 8,169,151 B2 | 5/2012 | Kimura | |
| 8,169,185 B2 | 5/2012 | Partovi et al. | |
| 8,193,769 B2 | 6/2012 | Azancot et al. | |
| 8,274,178 B2 | 9/2012 | Tucker | |
| 8,278,784 B2 | 10/2012 | Cook | |
| 8,362,744 B2 | 1/2013 | Terao et al. | |
| 8,421,274 B2 | 4/2013 | Sun et al. | |
| 8,629,652 B2 | 1/2014 | Partovi et al. | |
| 8,629,654 B2 | 1/2014 | Partovi et al. | |
| 8,663,106 B2 | 3/2014 | Stivoric | |

(Continued)

FOREIGN PATENT DOCUMENTS

| CN | 1826715 | 8/2006 |
|---|---|---|
| CN | 101243374 | 8/2006 |

(Continued)

OTHER PUBLICATIONS

U.S. Appl. No. 14/837,965, filed Aug. 27, 2015, Heresztyn et al.

(Continued)

*Primary Examiner* — Mohammed Alam
(74) *Attorney, Agent, or Firm* — Brownstein Hyatt Farber Schreck, LLP (57) ABSTRACT

Wireless power transfer systems having improved tolerance for coil misalignment are disclosed. These systems efficiently transfer power to accessories having a variety of power modes. For example, a power transmitter may vary the amount of power transmitted to a power receiver in response to changes in the power requirements of that power receiver. The power transmitter and the power receiver may be mutually tuned to filter or substantially reduce respective leakage inductances at both a primary and secondary operating frequency.

7 Claims, 3 Drawing Sheets

(56) References Cited

U.S. PATENT DOCUMENTS

| | | |
|---|---|---|
| 8,810,071 B2 | 8/2014 | Sauerlaender et al. |
| 8,884,469 B2 | 11/2014 | Lemmens |
| 8,922,525 B2 | 12/2014 | Chen et al. |
| 8,947,047 B2 | 2/2015 | Partovi et al. |
| 9,018,904 B2 | 4/2015 | Seyerle et al. |
| 9,030,421 B2 | 5/2015 | Tseng et al. |
| 9,093,857 B2 | 7/2015 | Sakai et al. |
| 9,099,885 B2 | 8/2015 | Kamata |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,124,112 B2 | 9/2015 | Havass et al. |
| 9,126,490 B2 | 9/2015 | Cook |
| 9,148,201 B2 | 9/2015 | Kallal et al. |
| 9,154,189 B2 | 10/2015 | Von Novak et al. |
| 9,160,180 B2 | 10/2015 | Suzuki et al. |
| 9,178,369 B2 | 11/2015 | Partovi |
| 9,197,065 B2 | 11/2015 | Divan et al. |
| 9,197,070 B2 | 11/2015 | Jung |
| 9,231,411 B2 | 1/2016 | Baarman et al. |
| 9,270,138 B2 | 2/2016 | Yamakawa et al. |
| 9,276,437 B2 | 3/2016 | Partovi et al. |
| 9,318,915 B2 | 4/2016 | Miller et al. |
| 9,352,661 B2 | 5/2016 | Keeling et al. |
| 9,356,659 B2 | 5/2016 | Partovi |
| 9,407,107 B2 | 8/2016 | Park et al. |
| 9,460,846 B2 | 10/2016 | Graham et al. |
| 9,461,502 B2 | 10/2016 | Lee |
| 9,496,731 B2 | 11/2016 | Park et al. |
| 9,515,514 B2 | 12/2016 | Lee et al. |
| 9,537,353 B1 | 1/2017 | Bossetti et al. |
| 9,685,814 B1 | 6/2017 | Moyer et al. |
| 9,813,041 B1 | 11/2017 | Ritter |
| 2001/0044588 A1 | 11/2001 | Mault |
| 2008/0284609 A1 | 11/2008 | Rofougaran |
| 2010/0328044 A1 | 12/2010 | Waffenschmidt et al. |
| 2011/0050164 A1 | 3/2011 | Partovi et al. |
| 2011/0109264 A1 | 5/2011 | Choi |
| 2011/0136550 A1 | 6/2011 | Maugars |
| 2011/0198937 A1 | 8/2011 | Tseng |
| 2011/0221385 A1* | 9/2011 | Partovi .................. H01F 5/003 320/101 |
| 2011/0234012 A1 | 9/2011 | Yi et al. |
| 2011/0241615 A1 | 10/2011 | Yeh |
| 2011/0254379 A1 | 10/2011 | Madawala |
| 2011/0302078 A1 | 12/2011 | Failing |
| 2012/0068550 A1* | 3/2012 | Boer ...................... H02J 7/025 307/104 |
| 2012/0146576 A1* | 6/2012 | Partovi ................ H01F 7/0252 320/108 |
| 2012/0255039 A1 | 10/2012 | Sipes |
| 2012/0313577 A1* | 12/2012 | Moes ................... H04B 5/0037 320/108 |
| 2013/0076648 A1 | 3/2013 | Krah et al. |
| 2013/0093388 A1 | 4/2013 | Partovi |
| 2013/0093389 A1 | 4/2013 | Partovi |
| 2013/0099735 A1 | 4/2013 | Partovi |
| 2013/0119778 A1* | 5/2013 | Jung .................... H01F 38/14 307/104 |
| 2013/0099563 A1 | 9/2013 | Partovi et al. |
| 2013/0234532 A1 | 9/2013 | Fells et al. |
| 2013/0257168 A1 | 10/2013 | Singh |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2013/0334326 A1 | 12/2013 | Shan |
| 2014/0015327 A1 | 1/2014 | Keeling et al. |
| 2014/0015522 A1 | 1/2014 | Widmer et al. |
| 2014/0035378 A1 | 2/2014 | Kesler et al. |
| 2014/0049422 A1* | 2/2014 | Von Novak ............ H02J 5/005 342/146 |
| 2014/0103873 A1 | 4/2014 | Partovi et al. |
| 2014/0129010 A1 | 5/2014 | Garg |
| 2014/0132210 A1 | 5/2014 | Partovi |
| 2014/0159501 A1 | 6/2014 | Kanno et al. |
| 2014/0159656 A1 | 6/2014 | Riehl |
| 2014/0191568 A1 | 7/2014 | Partovi |
| 2014/0191818 A1 | 7/2014 | Waffenschmidt et al. |
| 2014/0197687 A1 | 7/2014 | Lin |
| 2014/0197782 A1 | 7/2014 | Graf et al. |
| 2014/0225439 A1 | 8/2014 | Mao |
| 2014/0266018 A1 | 9/2014 | Carobolante |
| 2014/0306654 A1 | 10/2014 | Partovi |
| 2014/0347007 A1 | 11/2014 | Kee et al. |
| 2015/0001950 A1* | 1/2015 | Chung .................... H01F 38/14 307/104 |
| 2015/0035372 A1 | 2/2015 | Aioanei |
| 2015/0077045 A1 | 3/2015 | Harris |
| 2015/0280455 A1 | 3/2015 | Bosshard et al. |
| 2015/0130412 A1 | 5/2015 | Partovi |
| 2015/0207333 A1 | 7/2015 | Baarman et al. |
| 2015/0215006 A1 | 7/2015 | Mehas et al. |
| 2015/0244179 A1 | 8/2015 | Ritter et al. |
| 2015/0244341 A1 | 8/2015 | Ritter et al. |
| 2015/0270058 A1 | 9/2015 | Golko et al. |
| 2015/0333530 A1 | 11/2015 | Moyer et al. |
| 2015/0349538 A1 | 12/2015 | Agostinelli et al. |
| 2015/0364931 A1 | 12/2015 | Ren et al. |
| 2016/0043567 A1 | 2/2016 | Matumoto et al. |
| 2016/0056664 A1 | 2/2016 | Partovi |
| 2016/0064948 A1 | 3/2016 | Heresztyn et al. |
| 2016/0064992 A1 | 3/2016 | Herbst et al. |
| 2016/0127672 A1 | 5/2016 | Kamide et al. |
| 2016/0172894 A1 | 6/2016 | Khripkov et al. |
| 2016/0181849 A1 | 6/2016 | Govindaraj |
| 2016/0261137 A1 | 9/2016 | Riehl |
| 2016/0285278 A1 | 9/2016 | Mehas et al. |
| 2017/0012463 A1 | 1/2017 | Lynch |
| 2017/0089959 A1 | 3/2017 | Ito et al. |
| 2017/0110911 A1 | 4/2017 | Bossetti et al. |

FOREIGN PATENT DOCUMENTS

| | | |
|---|---|---|
| CN | 101232190 | 7/2008 |
| CN | 101814757 | 8/2010 |
| CN | 102124624 | 7/2011 |
| CN | 102257696 | 11/2011 |
| CN | 102355035 | 2/2012 |
| CN | 202712982 | 1/2013 |
| CN | 103019485 | 4/2013 |
| CN | 202976038 | 6/2013 |
| CN | 103269092 | 8/2013 |
| CN | 103324333 | 9/2013 |
| CN | 103326475 | 9/2013 |
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| EP | 1633122 | 8/2005 |
| EP | 2642628 | 9/2013 |
| GB | 2484999 | 5/2012 |
| JP | H08149608 | 6/1996 |
| JP | H08331850 | 12/1996 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014193087 | 10/2014 |
| KR | 20130055199 | 5/2013 |
| KR | 20140061337 | 5/2014 |
| WO | WO 10/077991 | 7/2010 |

(56) References Cited

FOREIGN PATENT DOCUMENTS

| | | |
|---|---|---|
| WO | WO 10/108191 | 9/2010 |
| WO | WO 11/156555 | 12/2011 |
| WO | WO 12/085119 | 6/2012 |
| WO | WO 13/122625 | 8/2013 |
| WO | WO 16/024869 | 2/2016 |

OTHER PUBLICATIONS

U.S. Appl. No. 14/628,897, filed Feb. 23, 2015, Ritter et al.
U.S. Appl. No. 14/627,957, filed Feb. 20, 2015, Ritter et al.
U.S. Appl. No. 14/795,723, filed Jul. 9, 2015, Herbst et al.
U.S. Appl. No. 14/449,075, filed Jul. 31, 2014, Ritter.
U.S. Appl. No. 14/295,249, filed Jun. 3, 2014, Bossetti et al.
U.S. Appl. No. 14/304,064, filed Jun. 13, 2014, Moyer et al.
U.S. Appl. No. 14/245,817, filed Apr. 4, 2014 Crosby et al.
U.S. Appl. No. 14/290,411, filed May 29, 2014, Bossetti.
U.S. Appl. No. 15/179,922, filed Jun. 10, 2016, Lynch.
U.S. Appl. No. 15/829,610, filed Dec. 1, 2017, Qiu et al.
U.S. Appl. No. 15/829,850, filed Dec. 1, 2017, Qiu et al.
U.S. Appl. No. 15/467,998, filed Mar. 23, 2017, Bentov et al.
U.S. Appl. No. 15/468,001, filed Mar. 23, 2017, Qiu et al.
U.S. Appl. No. 15/626,930, filed Jun. 19, 2017, Moyer et al.

* cited by examiner

TUNING OF PRIMARY AND SECONDARY RESONANT FREQUENCY FOR IMPROVED EFFICIENCY OF INDUCTIVE POWER TRANSFER

TECHNICAL FIELD

Embodiments described herein relate to electromagnetic power transfer systems, and in particular to systems and methods for selecting and tuning different resonant frequencies for power transmitters and power receivers.

BACKGROUND

Portable electronic devices may include one or more batteries that may require recharging from time to time. Such devices may include electric vehicles, cell phones, smart phones, tablet computers, laptop computers, wearable devices, navigation devices, sports devices, health analysis devices, medical data devices, location tracking devices, accessory devices, home appliances, peripheral input devices, remote control devices, and so on.

Some batteries may recharge wirelessly by accepting inductive power provided by an inductive power transmitter. For instance, a battery-powered electronic device configured to accept inductive power may be placed nearby a transmitter adapted to produce inductive power. In these systems, a transmitting coil within the transmitter may produce a time-varying electromagnetic flux that may induce a current within a receiving coil within the electronic device. The received current may be used by the electronic device to replenish the charge of a rechargeable battery.

In many examples, imperfect alignment of the transmitting coil and receiving coil may result in substantial power transfer efficiency losses.

Accordingly, there may be a present need for an inductive power transfer system with improved coil misalignment tolerance.

SUMMARY

Embodiments described herein may relate to, include, or take the form of a coupled coil system for wireless power transfer between a transmitter and receiver, including at least a receive coil in the receiver and a transmit coil in the transmitter. These embodiments may also include a first filter electrically connected to the receive coil and adapted to resonate with a leakage inductance of the transmit coil at a first frequency. Further embodiments may also include a second filter electrically connected to the transmit coil and adapted to resonate with a leakage inductance of the receive coil at a second frequency. In this configuration, the coupled coil system may be adapted for efficient inductive power transfer between the transmit coil and receive coil at more than one frequency.

Other embodiments may include a configuration in which the transmitter is contained within a first housing and the receiver is contained within a second housing. The first housing may include an interface surface, and the second housing may include a contact surface. The interface surface may be adapted to receive the contact surface. In many examples, the transmit coil may be aligned with the interface surface and the receive coil may be aligned with the contact surface. In this manner, when the interface surface receives the contact surface, the transmit coil may be substantially aligned with the receive coil.

Certain embodiments may include a configuration in which either or both of the first and second capacitors have a variable capacitance. For example, the capacitors may be a variable capacitor or, alternatively, a plurality of individual capacitors that each may be selectively activated or deactivated to provide a selectable capacitance. In some embodiments, a processor coupled to either coil may select and modify the capacitance of the associated capacitor. In many examples, the processor may select and/or modify the capacitance of the associated capacitor in response to a power transfer efficiency value that may be one of measured, approximated, predicted, or received by the processor.

For example, if the power transfer efficiency value indicates that that the power transfer efficiency between the transmit and receive coil is reduced or otherwise lower than expected, the operating frequency of power transfer may be increased and, in response, the associated capacitance may be lowered by the processor to resonate with an increased leakage inductance resulting from the increased operating frequency.

Embodiments described herein may also relate to, include, or take the form of an inductive charging system including at least an electronic device with a rechargeable battery, a receive coil electrically associated with the battery, and a first resonating component electrically connected to the receive coil.

Further embodiments may also include an inductive charging device with a housing with an interface surface for receiving the electronic device, a transmit coil within the housing and positioned below the interface surface, and a second resonating component electrically connected to the transmit coil. In these examples, the first resonating component may resonant at a first frequency, and the second resonating component may resonate at a second frequency. For example, the first frequency may be associated with a first alignment of the receive coil to the transmit coil when the electronic device may be received on the inductive charging device and the second frequency may be associated with a second alignment of the receive coil to the transmit coil.

Embodiments described herein may also relate to, include, or take the form of a method of providing power to a portable electronic device including at least the operations of providing an inductive charging device, placing the portable electronic device on the inductive charging device, generating (by the inductive charging device) a first magnetic flux within at least a portion of the portable electronic device. This first magnetic flux may vary at a first frequency. The method may also include the operation of reducing (by the portable electronic device) a leakage inductance within the inductive charging device by providing a first capacitor configured to resonate with the leakage inductance at the first frequency. The process may include operations of generating a second magnetic flux at a second frequency with the inductive charging device reducing a leakage inductance in the portable electronic device by providing a second capacitor configured to resonate with the leakage inductance at the second frequency.

BRIEF DESCRIPTION OF THE FIGURES

Reference will now be made to representative embodiments illustrated in the accompanying figures. It should be understood that the following descriptions are not intended to limit the disclosure to one preferred embodiment. To the contrary, it is intended to cover alternatives, modifications.

The use of the same or similar reference numerals in different drawings indicates similar, related, or identical items.

DETAILED DESCRIPTION

Embodiments described herein may relate to, include, or take the form of methods and systems for improving misalignment tolerance within an inductive power transfer system.

An inductive power transfer system typically includes an inductive power-transmitting component or device to transmit power and an inductive power-receiving component or device to receive power. In some examples, a battery-powered electronic device includes an inductive power-receiving component configured to charge one or more internal batteries. Example battery-powered electronic devices may include media players, media storage devices, personal digital assistants, tablet computers, cellular telephones, laptop computers, smart phones, styluses, global positioning sensor units, remote control devices, wearable devices, electric vehicles, home appliances, location tracking devices, medical data devices, health analysis devices, health monitoring devices sports devices, accessory devices, and so on. Example inductive power transmitting devices may include docks, stands, clips, plugs, mats, attachments, and so on.

In many examples, a battery-powered electronic device ("accessory") may be positioned on a power-transmitting device or surface ("dock"). In these systems, an electromagnetic coil within the dock ("transmit coil") may produce a time-varying electromagnetic flux ("transmitting power") to induce a current within an electromagnetic coil within accessory ("receive coil"). In other examples, a transmit coil may produce a static electromagnetic field and may physically move, shift, or otherwise change its position to produce a spatially-varying electromagnetic flux to induce a current within the receive coil.

The accessory may use the received current to replenish the charge of a rechargeable battery ("receiving power") or to provide power to operating components associated with the accessory. In other words, when the accessory is positioned on the dock, the dock may wirelessly transmit power via the transmit coil to the receive coil of the accessory.

A transmit coil and receive coil may be substantially annular and positioned substantially parallel to one another. If misaligned, the power transfer efficiency between the transmit coil and the receive coil decreases substantially. In many circumstances, decreased power transfer efficiency is undesirable. For example, the accessory may receive less power than desired to charge an internal battery at an optimal rate. In another example, the accessory with a completely depleted battery may receive insufficient power to turn on or charge the depleted battery at all.

In other examples, variances in the placement or construction of either the accessory or dock during manufacturing may yield different power transfer efficiencies between individually manufactured devices. For example, placement accuracy of the transmit coil within the housing of the dock may vary from an expected position a certain known or unknown amount. In addition, the thickness and material properties of the housing of the dock may also vary. These and other manufacturing variances, which may additionally present within the accessory, may affect the alignment of the transmit and receive coils which may, in turn, substantially affect the power transfer efficiency of different accessories or docks.

To account for imperfectly aligned coils, whether misaligned by user error or manufacturing defects, conventional designs typically increase the power to the transmit coil in order to increase the power received by the accessory. Although the accessory may receive adequate and expected power, the system on the whole operates inefficiently when the transmit coil and receive coil are misaligned. In these cases, power that is transmitted by the dock that is not received by the accessory power may be dissipated as heat and/or may be absorbed by (or may interfere with) other electronic devices or components nearby.

In other examples, the power transfer efficiency may be different depending on the power actually required by the accessory. For example, an accessory may have more than one power consuming state such as a high power state and a low power state. Transferring power to an accessory in a low power state may be less efficient in certain cases than transferring power to an accessory in a high power state. Accordingly, conventional designs are typically optimized for more efficient power transfer to an accessory in a high power state. In these examples, although the accessory may receive adequate and expected power, the system on the whole may operate inefficiently when transferring power to an accessory in a low power state.

Thus, conventional designs account for power transfer efficiency losses that result from misalignment of coils and variances in power requirements of the accessory by reducing the power use efficiency of the system on the whole in favor of providing required power to the accessory.

Accordingly, embodiments described herein generally relate to wireless power transfer systems having improved tolerance for coil misalignment. These embodiments may also efficiently transfer power to accessories having a variety of power modes. For example, a dock may vary the amount of power transmitted to the accessory in response to changes in the power requirements of that accessory. In these examples, the dock may transmit the different amounts power at different frequencies. In other words, a dock may associate an accessory's low power state with a low power transfer frequency and an accessory's high power state with a high power transfer frequency.

The dock may use real-time or historical information related to the power transfer efficiency (between the dock and accessory) to determine the amount and frequency of power transferred to the accessory. The power transfer efficiency information used by the dock may be stored, received, estimated, or predicted by either the dock or the accessory. Once obtained, the power transfer efficiency information may be used by the dock to dynamically, intelligently, and/or rapidly adjust the power transmitted to the accessory, such as by varying the operating frequency and amplitude at which power is transmitted.

For example, the dock and accessory may communicate power efficiency information over one or more communication channels. Example communication channels may include wireless communication channels such as Wi-Fi, Bluetooth, Near Field Communication, infrared, or any other suitable wireless communication channel. In other embodiments, the dock and accessory may communicate via a high frequency signal sent between the transmit coil and the receive coil.

In other embodiments, power transfer efficiency information may include a static value determined during or after manufacturing of a particular dock or accessory. The information may be stored on a per-accessory or per-dock basis.

In other examples, power transfer efficiency information may be approximated or estimated by measuring an inductive load as experienced by the transmit coil within the dock. In still further examples, power transfer efficiency may be predicted based on historical power transfer efficiency data.

In these and other embodiments, the dock may transmit power to the accessory at a variety of frequencies and amplitudes. Accordingly, embodiments described herein include accessories and docks that are tuned for efficient power transfer at a variety of frequencies. For example, a receive coil of an accessory may be coupled to a resonating filter (such as a capacitor) that is tuned to reduce or eliminate the effects of leakage inductance within the transmit coil when the transmit coil is operating at a first frequency. Similarly, the transmit coil of the dock may be coupled to a resonating filter (such as a capacitor) that is tuned to reduce or eliminate the effects of leakage inductance within the receive coil when the receive coil is operating at a second frequency. In other words, the accessory and dock may be mutually tuned to operate efficiently at two frequencies.

Figure 1A:
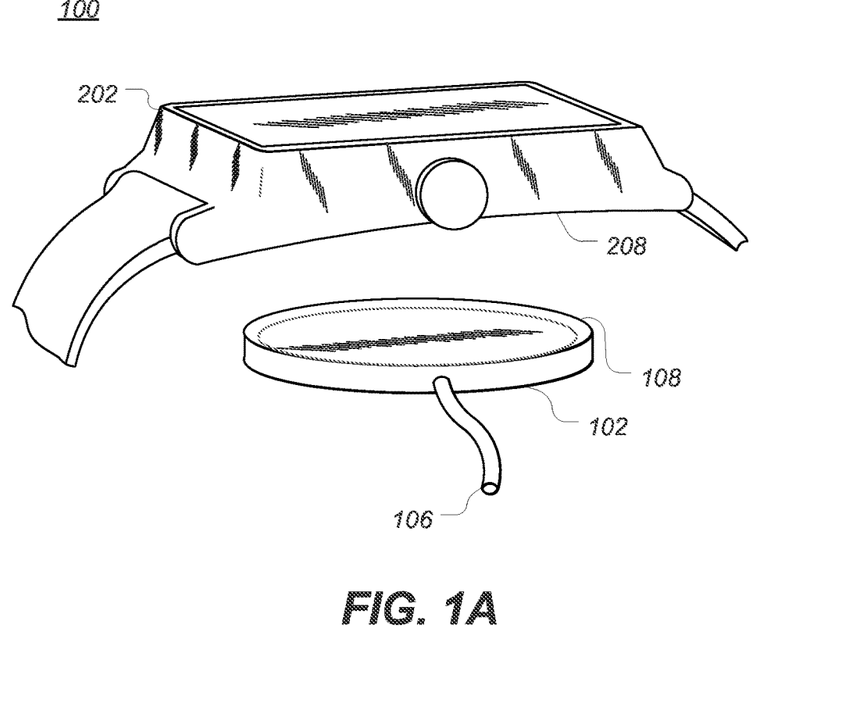
FIG. 1A depicts a front perspective view of an example inductive power transfer system in an unmated configuration.

FIG. 1A depicts a front perspective view of an example inductive power transfer system in an unmated configuration. The illustrated embodiment shows an inductive power transmitter dock that is configured to couple to and wirelessly pass power to an inductive power receiver accessory such as a portable electronic device or wearable accessory.

The wearable accessory, such as depicted in FIG. 1A, may provide health-related information or data such as, but not limited to, heart rate data, blood pressure data, temperature data, oxygen level data, diet/nutrition information, medical reminders, health-related tips or information, or other health-related data. The wearable accessory may optionally convey the health-related information to a separate electronic device such as a tablet computing device, phone, personal digital assistant, computer, and so on.

A wearable accessory may include a coupling mechanism to connect a strap or band useful for securing to a user. For example, a smart watch may include a band or strap to secure to a user's wrist. In another example, a wearable health assistant may include a strap to connect around a user's chest, or alternately, a wearable health assistant may be adapted for use with a lanyard or necklace. In still further examples, a wearable device may secure to or within another part of a user's body. In these and other embodiments, the strap, band, lanyard, or other securing mechanism may include one or more electronic components or sensors in wireless or wired communication with the accessory. For example, the band secured to a smart watch may include one or more sensors, an auxiliary battery, a camera, or any other suitable electronic component.

In many examples, a wearable device, such as depicted in FIG. 1A, may include a processor coupled with or in communication with a memory, one or more communication interfaces, output devices such as displays and speakers, and one or more input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable device may provide information regarding time, health, statuses or externally connected or communicating devices and/or software executing on such devices, messages, video, operating commands, and so forth (and may receive any of the foregoing from an external device), in addition to communications.

Although the system 100 illustrated in FIG. 1A depicts a wristwatch or smart watch, any electronic device may be suitable to receive inductive power from an inductive power transmitting dock. For example, a suitable electronic device may be any portable or semi-portable electronic device that may receive inductive power, and a suitable dock device may be any portable or semi-portable docking station that may wirelessly transmit inductive power.

Accordingly, the system 100 may include an inductive power transmitter 102 and an inductive power receiver 202. The inductive power transmitter 102 and the inductive power receiver 202 may each respectively include a housing to enclose electronic components therein. In many examples, and as depicted, the inductive power receiver 202 may be larger than the inductive power transmitter 102, although such a configuration is not required.

In the illustrated embodiment, the inductive power transmitter 102 may be connected to power, such as an alternating current power outlet, by power cord 106. In other embodiments, the inductive power transmitter 102 may be battery operated. In still further examples, the inductive power transmitter 102 may include a power cord 106 and an internal or external battery. Similarly, although the embodiment is depicted is shown with the power cord 106 coupled to the housing of the inductive power transmitter 102, the power cord 106 may be connected by any suitable means. For example, the power cord 106 may be removable and may include a connector that is sized to fit within an aperture or receptacle opened within the housing of the inductive power transmitter 102.

Figure 1B:
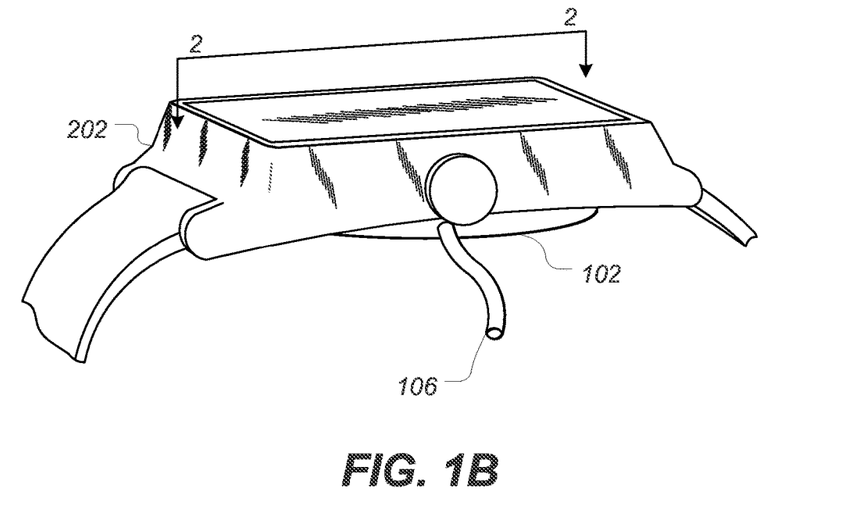
FIG. 1B depicts a front perspective view of an example inductive power transfer system in a mated configuration.

As shown, the inductive power receiver 202 may include a lower surface 208 that may interface with, align or otherwise contact an interface surface 108 of the inductive power transmitter 102. In this manner, the inductive power receiver 202 and the inductive power transmitter 102 may be positionable with respect to each other. In certain embodiments, the interface surface 108 may be configured in a particular shape that mates with a complementary shape of the inductive power receiver 202, for example as shown in FIG. 1B. The interface surface 108 may include a concave shape that follows a selected curve. The bottom surface 208 of the inductive power receiver 202 may take a convex shape following the same or substantially similar curve as the interface surface 108. In other examples, the interface surface 108 may be substantially flat.

Additionally or alternatively, the inductive power transmitter and receiver devices 102, 202 can be positioned with respect to each other using one or more alignment mechanisms. As one example, one or more magnetic devices may be included in the transmitter and/or receiver devices 102, 202 and may be used to align the transmitter and receiver devices with respect to one another. In another example, one or more actuators in the transmitter and/or receiver devices 102 can be used to align the transmitter and receiver devices.

And in yet another example, alignment features, such as protrusions and corresponding indentations in the housings of the transmitter and receiver devices, may be used to align the transmitter and receiver devices. The design or configuration of the interface surfaces, one or more alignment mechanisms, and one or more alignment features can be used individually or in various combinations thereof.

Figure 2:
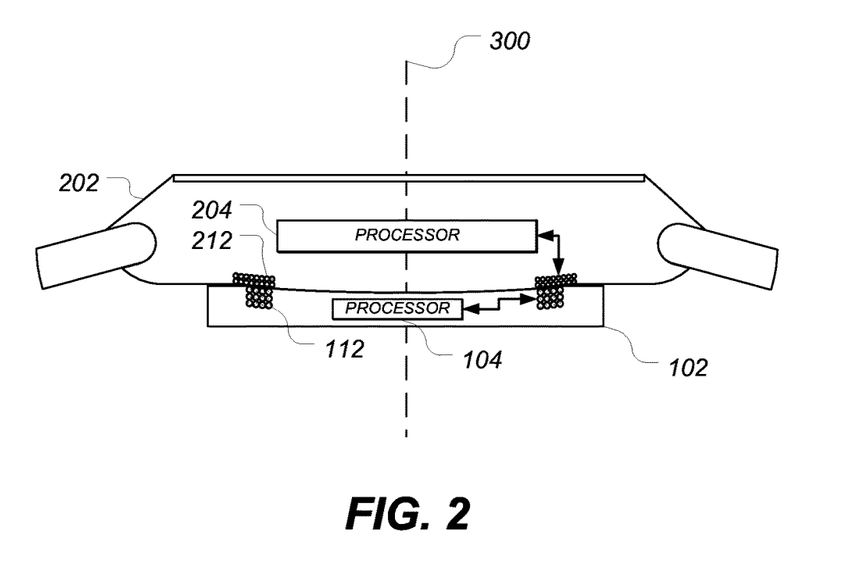
FIG. 2 depicts a side cross-section view of the inductive power transfer system of FIG. 1B along line 2-2.

FIG. 2 depicts a side cross-section view taken along line 3-3 of FIG. 1B, showing the example inductive power transfer system in an aligned configuration. As illustrated, the bottom surface 208 of the inductive power receiver 202 contacts the interface surface of the inductive power transmitter 102. As described partially with respect to FIG. 1A, the inductive power receiver 202 may include one or more electronic components within its housing such as a processor 204 and a receive coil 212. The receive coil 212 may have one or more windings and may receive power from the inductive power transmitter 102. Thereafter, the receive coil 212 may pass the received power to the processor 204. The processor 204 may use the received power to perform or coordinate one or more functions of the inductive power receiver 202 and/or to replenish the charge of a battery (not shown).

The inductive power receiver 202 may also include other electronic components coupled to the processor 204. For example, the inductive power receiver 202 can include memory, a display, one or more input/output devices such as buttons, force interfaces, touch interfaces, microphones, and/or speaker(s), communication interfaces for wired and/or wireless communication, and so on.

The inductive power receiver 202 may also include one or more sensors used by the processor 204 to collect environmental information, user information, or any other type of information. Environmental sensors may include weather sensors such as barometric pressure sensors, humidity sensors, particle counters, temperature sensors, moisture sensors, ultraviolet sensors, infrared sensors, airflow and wind sensors, precipitation sensors, accumulation sensors, and so on. User information sensors may include health-related sensors such as skin conductance sensors, temperature sensors, pulse oximetry sensors, blood pressure sensors, and so on.

The inductive power transmitter 102 may also include a transmit coil 112 having one or more windings. The transmit coil 112 may transmit power to the inductive power receiver 202. The transmit coil 112 may be coupled to a processor 104 that may at least partially control the transmit coil 112. For example, in certain embodiments, the processor 104 may drive the transit coil 112 with a power signal in order to induce a particular voltage within the receive coil 212. The processor 104 may control or periodically adjust one or more aspects of the power signal applied to the transmit coil 112. For example, the processor 104 may change the operating frequency of the power signal. In some examples, the operating frequency of the power signal may be increased in order to increase the power received by the receive coil 212. In addition, the processor 104 may be used to perform or coordinate other functions of the inductive power transmitter 102.

As noted above, power transfer efficiency between the inductive power transmitter 102 and the inductive power receiver 202 may be optimized when the receive coil 212 is aligned with the transmit coil 112 along a mutual axis. In many examples, a slight misalignment of the inductive power transmitter 102, for example resulting from manufacturing variances, and the inductive power receiver 202 may result in a substantial misalignment of the transmit coil 112 and receive coil 212. In many examples, misalignment may, in turn, substantially reduce power transfer efficiency. Generally, the inductive power transmitter 102 and the inductive power receiver 202 are aligned along a mutual axis 300, as shown in FIG. 2.

Figure 3:
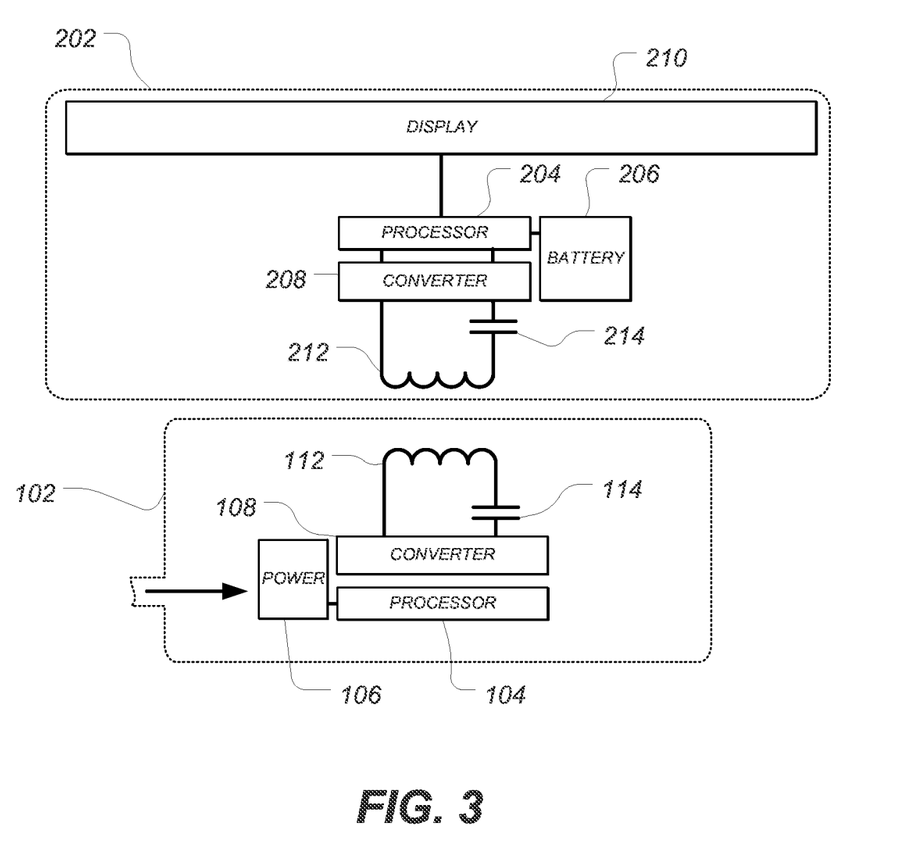
FIG. 3 depicts a simplified signal flow block diagram of a sample inductive power transfer system.

FIG. 3 depicts a simplified signal flow block diagram of a sample inductive power transfer system. The inductive power transfer system may include an inductive power transmitter 102 and an inductive power receiver 202 separated by a gap. The inductive power receiver 202 is depicted positioned on a top surface of the inductive power transmitter 102, although such a configuration is not required. The gap may be an air gap, or may include intervening structures, or may have both air and intervening structures.

The inductive power transmitter 102 may include a clock connected to a processor 104 and a direct current converter 108. The clock can generate one or more timing signals for the inductive power transfer system. The processor 104 may be coupled to a power supply 106, such as a direct current power supply or an alternating current power supply. In certain embodiments, the processor 104 may control the state of the direct current converter 108, which receives a power input from the power supply 106. In one embodiment, the clock generates periodic signals that are used by the processor 104 to activate and deactivate switches in the direct current converter 108. The switches may convert the direct current from the power supply 106 to alternating current suitable for exciting a transmit coil 112.

In these embodiments, the transmitter 102 of the inductive power transfer system may provide a time-varying signal to the transmit coil 112 in order to induce a voltage within the receive coil 212 in the receiver through inductive coupling with the transmit coil 112. In this manner, power may be transferred from the transmit coil 112 to the receive coil 212. The signal produced in the receive coil 212 may be received by a direct current converter 208 that converts the signal into a direct current signal that may be used to replenish a battery 206. Any suitable direct current converter 208 can be used in the inductive power transfer system. For example, in one embodiment, a rectifier may be used as a direct current converter. A programmable load such as a processor 204 may then receive the direct current signal. The processor 204 may perform or coordinate one or more functions of the inductive power receiver 202. For example, the processor 204 may couple to and control a display 210 and a battery 206.

Both the inductive power transmitter 102 and the inductive power receiver 202 may include a resonating filter 114 and 214 respectively. The resonating filters 114 and 214 are configured to resonate with leakage inductances of the inductive power receiver 202 and the inductive power transmitter 102 respectively. More particularly, the resonating filter 114 may resonate with a leakage inductance exhibited within the receive coil 212 when the transmit coil 112 is transferring power to the receive coil 212 at a first frequency. The resonating filter 214 may resonate with a leakage inductance exhibited within the transmit coil 112 when the transmit coil 112 is transferring power to the receive coil 212 at a second frequency.

In this manner, when the transmit coil 112 is operating at the first frequency, the leakage inductance within the transmit coil 112 is substantially reduced, whereas the leakage inductance within the receive coil 212 may be only partially reduced. On the other hand, when the transmit coil 112 is operating at the second frequency, the leakage inductance within the receive coil 212 is substantially reduced, whereas the leakage inductance within the transmit coil 112 may be only partially reduced.

This configuration may be especially suited for transferring power to an inductive power receiver 202 that has a variety of power consumption modes. For example, it may be more efficient to transfer power at a lower frequency to an inductive power receiver 202 in a low power mode. In such a case, the inductive power transmitter 102 may transmit power at a low frequency. In this mode, the leakage inductance within the transmit coil 112 may be a larger system loss than the leakage inductance within the receive coil 212. Accordingly, the resonating filter 214 may be tuned to reduce the leakage inductance of the transmit coil 112 when operating at low frequencies. In this manner, the system is more efficient at low frequencies. In some embodiments, low frequency power transfer may occur at or around 210 kHz Similarly, it may be more efficient to transfer power at a higher frequency to an inductive power receiver 202 operating in a higher power mode. In such a case, the inductive power transmitter 102 may transmit power at a high frequency. In this mode, the leakage inductance within the transmit coil 112 may be or generate a smaller overall system loss than the leakage inductance within the receive coil 212. Accordingly, the resonating filter 114 may be tuned to reduce the leakage inductance of the receive coil 212 when operating at high frequencies. In this manner, the system is more efficient at high frequencies. In some embodiments, high frequency power transfer may occur at or around 250 kHz.

In these embodiments, the frequencies at which the resonating filters 114, 214 are tuned may be fixed during manufacturing. For example, in some embodiments, the resonating filter 114, 214 may be comprised of multiple capacitors in a circuit providing a net capacitance. For example, a plurality of individual capacitors may be connected in series in order to provide a particular capacitance value. In some embodiments, individual inductive power receivers 202 or individual inductive power transmitters 102 may include one or more capacitor bays (e.g., groups of capacitors) defining the resonating filters 114, 214. These capacitor bays may be tuned to a selected capacitance on a per-device basis during manufacturing.

In still further embodiments, the resonating filters 114, 214 may have a variable capacitance. For example, each of the resonating filters 114, 214 may be a variable capacitor or, alternatively, a group of individual capacitors, each of which may be selectively activated or deactivated to provide a selectable capacitance. In certain embodiments, the processors 104, 204 may select and modify the capacitance of the associated resonating filter 114, 214. In these examples, the respective processor 104, 204 may select and/or modify the capacitance of the associated resonating filter 114, 214 in response to a power transfer efficiency value that may be one of measured, approximated, predicted, or received by the processor. For example, if the processor 104 determines that the power transfer efficiency has decreased, the processor may increase the frequency of power transfer. In response to the increased frequency of power transfer, the processor 204 may alter the capacitance of the resonating filter 214 so as to account for a change in the leakage inductance within the transmit coil 112. Similarly, the resonating filter 114 may be adjusted by the processor 104 in order to increase the power transfer efficiency by filtering the leakage inductance exhibited within the receive coil 212.

In still further embodiments, the resonating filter 214 may be tuned differently for different power requirements of the device in which it may be included. For example, the power requirements of portable electronic devices that may include an inductive power receiver may vary. In some examples, the resonating filter 214 may be tuned to resonant at a different frequency for different devices. In this manner, the same inductive power transmitter 102 may be used for a number of inductive power receivers 202, each having different power requirements.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

I claim:

1. A coupled coil system for wireless power transfer between a transmitter and receiver, comprising:
   a receive coil in the receiver;
   a transmit coil in the transmitter;
   a first filter electrically connected to the receive coil and operable to be dynamically tuned to resonate with a leakage inductance of the transmit coil at a first frequency, the first filter comprising one of:
      a variable capacitor; and
      a plurality of individual capacitors that each may be selectively activated or deactivated to provide a selectable capacitance; and
   a processor coupled to the receive coil and configured to select and modify the capacitance of the first filter in response to a power transfer efficiency value that is one of measured, approximated, predicted, or received by the processor.

2. The coupled coil system of claim 1, further comprising a second filer electrically connected to the transmit coil and adapted to resonate with a leakage inductance of the receive coil at a second frequency.

3. The coupled coil system of claim 2, wherein:
   the transmitter is contained within a first housing; and
   the receiver is contained within a second housing.

4. The coupled coil system of claim 3, wherein:
   the first housing comprises an interface surface; and
   the second housing comprises a contact surface.

5. The coupled coil system of claim 2, wherein the second filter comprises one of:
   a variable capacitor; and
   a plurality of individual capacitors that each may be selectively activated or deactivated to provide a selectable capacitance.

6. The coupled coil system of claim 5, further comprising a processor coupled to the transmit coil and configured to select and modify the capacitance of the second filter.

7. The coupled coil system of claim 6, wherein the processor is configured to select and modify the capacitance of the second filter in response to a power transfer efficiency value that is one of measured, approximated, predicted, or received by the processor.

* * * * *